United States Patent [19]

Stopper

[11] Patent Number: 4,536,323
[45] Date of Patent: Aug. 20, 1985

[54] NON-FLAMMABLE AEROSOL PROPELLANT MICROEMULSION SYSTEM

[75] Inventor: Howard R. Stopper, Cincinnati, Ohio

[73] Assignee: The Drackett Company, Cincinnati, Ohio

[21] Appl. No.: 508,643

[22] Filed: Jun. 28, 1983

[51] Int. Cl.$^3$ ............................................. C09K 3/30
[52] U.S. Cl. ................................... 252/305; 252/70; 252/90; 252/DIG. 19; 524/903
[58] Field of Search .................. 252/305, 90; 524/903

[56] References Cited

U.S. PATENT DOCUMENTS

| | | | |
|---|---|---|---|
| 2,356,205 | 8/1944 | Blair, Jr. et al. | 252/8.55 |
| 2,655,480 | 10/1953 | Spitzer et al. | 252/305 X |
| 3,207,386 | 9/1965 | Presant et al. | 222/394 |
| 3,254,714 | 6/1966 | Gogarty et al. | 166/9 |
| 3,275,075 | 9/1966 | Gogarty et al. | 166/9 |
| 3,301,325 | 1/1967 | Gogarty et al. | 166/9 |
| 3,307,628 | 3/1967 | Sena | 166/9 |
| 3,346,494 | 10/1967 | Robbins et al. | 252/33.2 |
| 3,387,425 | 6/1968 | Flanner | 252/305 X |
| 3,409,461 | 11/1968 | Mehlo et al. | 117/100 |
| 3,467,194 | 9/1969 | Kinney et al. | 166/305 |
| 3,493,048 | 2/1970 | Jones | 166/252 |
| 3,495,988 | 2/1970 | Balassa | 99/71 |
| 3,505,236 | 4/1970 | Anstett | 252/90 |
| 3,506,070 | 4/1970 | Jones | 166/273 |
| 3,536,106 | 10/1970 | Jones | 166/252 |
| 3,540,532 | 11/1970 | Davis, Jr. et al. | 166/252 |
| 3,630,951 | 12/1971 | Netherly | 252/307 |
| 3,641,181 | 2/1972 | Robbins et al. | 260/674 |
| 3,691,090 | 9/1972 | Kitajima et al. | 252/316 |
| 3,719,606 | 3/1973 | Froning et al. | 252/306 |
| 3,737,337 | 6/1973 | Schnoring et al. | 117/100 |
| 3,778,381 | 12/1973 | Rosano et al. | 252/311 |
| 3,813,345 | 5/1974 | Urton | 252/312 |
| 3,839,220 | 10/1974 | Barchas | 252/305 |
| 3,954,627 | 5/1976 | Dreher et al. | 252/8.5 P |
| 3,975,294 | 8/1976 | Dumoulin | 252/354 |
| 3,989,843 | 11/1976 | Chabert et al. | 424/325 |
| 4,046,519 | 9/1977 | Piotrowski | 44/51 |
| 4,052,331 | 10/1977 | Dumoulin | 252/312 |
| 4,122,051 | 10/1978 | Friberg et al. | 260/22 A |
| 4,146,499 | 3/1979 | Rosano | 252/186 |
| 4,252,657 | 2/1981 | Barriol et al. | 252/8.55 D |

FOREIGN PATENT DOCUMENTS 1439361 6/1976 France .

OTHER PUBLICATIONS

Gerbacia et al.: "The Stability of Microemulsion Systems", *Colloid Interface Science* (Proceedings International Conference), vol. 2, pp. 245–256, (1976).
Rosano, "Microemulsions", J. Soc. Cosmet. Chem., vol. 25, pp. 609–619, Nov. (1974).
Gerbacia et al., "Solubilization in Aqueous Mixed Micellar Solutions: Water-Potassium Oleate-1-Pentanol–Benzene", J. Amer. Oil Chem. Soc., vol. 53, pp. 101–104, (1976).
Gerbacia et al., "Microemulsions: Formation and Stabilization", J. Colloid and Interface Sci., vol. 44, pp. 242–248, (1973).
Rosano et al., "Les Microemulsions", Revue Francaise de Corps Gras, vol. 16, pp. 249–257, (1969).
Gerbacia et al., The Stability of Microemulsions Systems, (undated).

*Primary Examiner*—Richard D. Lovering
*Attorney, Agent, or Firm*—Charles Zeller

[57] ABSTRACT

The amount of gaseous flammable propellants such as dimethylether, difluoroethane, propane, butane, and the like can be increased to as high as from 30 to 50% by weight of a propellant composition by dissolving the normally gaseous propellant in the dispersed oil phase of an oil-in-water microemulsion. The aerosol propellant compositions can be simply prepared by metering the ingredients other than the gaseous propellants into an aerosol dispenser, then adding the gaseous propellant, under suitable pressure, into the aerosol dispenser whereby simply shaking of the dispenser will result in the spontaneous formation of an oil-in-water microemulsion which is clear and stable and which can contain as much as about 50% by weight of the gaseous propellant without causing flaming when the composition is sprayed directly into a candle flame.

21 Claims, No Drawings

NON-FLAMMABLE AEROSOL PROPELLANT MICROEMULSION SYSTEM

BACKGROUND OF THE INVENTION

I. Field of the Invention

This invention relates to a propellant composition for aerosol dispensers which is in the form of an oil-in-water microemulsion. More particularly, this invention relates to a composition and method for rendering highly flammable gaseous aerosol propellants non-flammable by dissolving the gaseous propellants in a water-immiscible solvent which is the dispersed phase of and oil-in-water microemulsion system.

It is known from U.S. Pat. No. 3,207,386 to Presant, et al. to suppress the flammability of gaseous propellants for aerosol dispensers by dissolving the propellant in a continuous liquid aqueous phase. However, according to Presant, the maximum concentration of the flammable propellant in the aqueous phase is determined by the limit of its solubility.

On the other hand, the microemulsion technology has also been highly developed, although the primary area of application for both oil-in-water and water-in-oil microemulsions is in the petroleum industry for oil recovery processes. Microemulsions have the advantages of being thermodynamically stable and transparent or clear systems and, therefore, would readily lend themselves to commercial application for consumer and industrial products. Representative of the patent art relating to the use of microemulsions for oil and petroleum recovery include U.S. Pat. Nos. 2,356,205, 3,254,714, 3,301,325, 3,307,628, 3,536,136, 3,540,532, 3,719,606, 3,954,627 and 4,252,657. Water-in-oil microemulsion systems having utility as lubricants for diesel and gasoline engine service and for applying trace elements to mineral-deficient crops are described in U.S. Pat. No. 3,346,494. The use of microemulsions for separating organic compounds in the liquid state is described in U.S. Pat. No. 3,641,181. Oil-in-water microemulsions for lacquers and paints are described in U.S. Pat. No. 4,122,051. A motor fuel in the form of a microemulsion is taught in U.S. Pat. No. 4,046,519.

U.S. Pat. Nos. 3,975,294 and 4,052,331 both describe particular surface-active compositions which can be used as an emulsifier with diorganopolysiloxanes to form transparent microemulsions or transparent gels or to introduce silane cross-linking agents into catalyzed aqueous polysiloxane emulsions to cross-link the emulsion.

Rosano in U.S. Pat. No. 4,146,499 describes a method for the preparation of oil-in-water microemulsions which are described as useful in a variety of applications including as a reaction vehicle for chemical reactions, as a drug delivery system, as an edible food carrier, as a liquid vehicle for water-insoluble dyes and pigments, in cosmetic formulations, and generally for forming stable compositions of hydrophobic substances.

While it is clear that Rosano discloses oil-in-water microemulsions with various ingredients dissolved in the oil phase, this patent does not disclose or suggest dissolving flammable propellants in the oil phase to reduce their flammability.

SUMMARY OF THE INVENTION

Accordingly, it is an object of the present invention to increase the amount of useful flammable gaseous propellant that can be safely stored in an aerosol dispenser without limiting the amount of the flammable gaseous propellant by the limit of its solubility in water.

It is a particular object of the invention to provide a propellant composition for aerosol dispensers that can safely contain up to about 40% to 50% or more by weight of the composition of flammable gaseous propellants without creating a flammability hazard.

These and other objects of the invention, which will become more apparent from the following detailed description, have been accomplished by a propellant composition for aerosol dispensers which is capable of forming spontaneously an oil-in-water microemulsion upon being introduced under pressure into an aerosol dispenser. The composition includes a water-immiscible liquid that is a solvent for the propellant, water, a mixed surfactant system containing at least one primary surfactant and at least one secondary surfactant, wherein the mixed surfactant systems has a hydrophilic-lipophilic balance sufficient to cause the water-immiscible liquid to spontaneously disperse as micro-droplets in the water, and at least one normally gaseous flammable aerosol propellant dissolved in the water-immiscible liquid. When the composition is introduced under pressure into an aerosol dispenser, an oil-in-water microemulsion is spontaneously formed, the water-immiscible liquid having the propellant(s) dissolved therein to form the dispersed phase of micro-droplets, which micro-droplets are separated from the continuous water phase by the mixed surfactant system. In these compositions, the amount of the propellant can be as high as 40% to 50% or more by weight based on the weight of the composition. For instance, the propellant composition used to form the oil-in-water microemulsion system may preferably contain from about 15 to 25% by weight of water, 23 to 35% by weight of the water-immiscible liquid, 3 to 20% by weight of the mixed surfactant system, and about 30 to about 55% by weight of the flammable gaseous propellant or propellants.

According to another aspect of the present invention, a method is provided for preparing a non-flammable aerosol propellant composition from normally flammable gaseous aerosol propellant by filling the aerosol dispenser with a spontaneously formable oil-in-water microemulsion system in which the dispersed oil phase is a water-immiscible liquid that is a solvent for the propellant or propellants, and introducing the gaseous propellant while under pressure into the aerosol dispenser, whereby an oil-in-water microemulsion in which the at least one propellant is present in the dispersed oil phase is spontaneously formed by shaking the contents of the aerosol dispenser.

DETAILED DESCRIPTION OF THE INVENTION AND PREFERRED EMBODIMENTS

As described in the aforementioned U.S. Pat. No. 4,146,499 to Rosano, a microemulsion is a dispersion of two immiscible liquids (one liquid phase being "dispersed" and the other being "continuous") in which the individual droplets of the dispersed phase have an average radius less than about ¼ of the wavelength of light. Typically, in a microemulsion the dispersed phase droplets are less than about 1,400 A radius, and preferably in the order of 100 A to 500 A. Because the individual droplets or "micro-droplets" of the dispersed phase are of a size smaller than the wavelength of light, they appear transparent and, accordingly, microemulsions are characterized by being clear or transparent. Still further, the microemulsions of the present invention are further characterized by being substantially infinitely thermodynamically stable, that is, once formed, the dispersed phase and continuous phase will not separate.

The principles of the formation of microemulsions with regard to the requirements of the primary and secondary surfactants of the mixed surfactant system, such as the solubility relationships with respect to the oil and water phases and with respect to each other are substantially as described in the previously mentioned patents including the Rosano U.S. Pat. No. 4,146,499. However, contrary to the teachings by Rosano for forming his oil-in-water microemulsion systems which requires a three-step process in which they primary surfactant is first dissolved in the water-immiscible liquid, and then the solution of the primary surfactant and the water-immiscible liquid is dispersed into the aqueous phase to form a lactescent (milky) emulsion, and finally the secondary surfactant is added to the lactescent emulsion to form the clear microemulsion, the present inventor has found that the stable and clear oil-in-water microemulsion will form spontaneously if all of the ingredients, namely the water-immiscible liquid, water, and mixed surfactant system, are added together in the proper proportions. Accordingly, it is a particular advantage of the present invention that the ingredients of the microemulsion need only be metered into the aerosol container followed by pressurization with the selected gaseous propellant whereby mere shaking of the container results in spontaneous formation of the microemulsion. Accordingly, the requirements for large batching and mixing tanks and high shear mixing and homogenizers or other agitation systems normally needed to form an emulsion can be eliminated in the preparation of the pressurized aerosol emulsions according to the present invention.

An additional advantage derived from the present invention is the fact that the compositions are non-flammable in spite of the fact that they may contain as much as 40 to 50% or more of flammable propellants. In comparison, in most conventional aerosol dispensed products, the amount of flammable propellant must be limited to less than about 15 to 20% to be non-flammable. Even in the systems disclosed in the aforementioned U.S. Pat. No. 3,207,386 to Presant, et al., the maximum amount of the dimethylether propellant is about 25%.

By having larger amounts of the propellant system present in the aerosol dispenser, it becomes possible to more readily guarantee that the entire contents of the dispenser can be effectively utilized and, if desired, at higher pressures.

The oil-in-water microemulsion of this invention can be used as such as a cleaning composition by taking advantage of the detergent properties of the surfactant system as well as the solvating action of the water and water-immiscible liquid for most aqueous based and organic based soils and stains, respectively. Moreover, the microemulsions have broad general utility in substantially all applications for which emulsion systems have previously been used including the various utilities disclosed in the Rosano patent and in the other patent references mentioned above.

Thus, by proper selection of the water-immiscible liquid and the aqueous phase of the microemulsions a broad variety of oil soluble and water soluble "active" ingredients can be dispensed with the aerosol compositions of this invention.

The aerosol microemulsion systems of this invention are non-flammable even though they may contain up to 50% or more of flammable gaseous propellants. It is believed that the non-flammability of these compositions results from the fact that the flammable propellants are oil soluble and are present in the microemulsion as part of the dispersed oil phase micro-droplets of the emulsion which are surrounded by a surfactant/water film (the external phase). Thus, the flammable propellant is essentially encapsulated by the water. Therefore, when the aerosol composition is sprayed into a candle flame, it behaves as only water and does not ignite. Conversely, emulsions which are milky or opaque in which the particle sizes are in the range of from about 1 to 10 microns (10,000 to 100,000 A) do not exhibit this non-flammability phenomenon in an aerosol container.

The flammability of these emulsions are even further reduced by using a non-flammable water-immiscible liquid such as methylene chloride which is also a good solvent for the gaseous aerosol propellants. Moreover, the flammability of these microemulsions may be further reduced by lastly adding to the formed microemulsion a compressed gas such as carbon dioxide, nitrous oxide, nitrogen, or nonflammable fluorocarbons, for example, dichlorotetrafluoroethane, dichlorodifluoromethane, and trifluoromethane, up to the saturation limit of the composition. Incorporation of such compressed gases into the microemulsion to further reduce flammability do not substantially change the stability of the microemulsion.

A typical composition according to the present invention includes the following ingredients in the following amounts:

| Ingredient | Parts by Weight |
| --- | --- |
| Water | 22.0 |
| Methylene Chloride | 30.0 |
| Sipon WD-Alcolac Inc. | 0.3 |
| Sodium Lauryl Sulfate | |
| HLB 40 | |
| Igepal CO-430 - G.A.F. Corp. | 3.5 |
| Isononyl phenol ethoxylate | |
| (4 moles ethylene oxide) | |
| HLB 8.8 | |
| Neodol 25-9 - Shell Chemical Co. | 3.5 |
| Primary alcohol ethoxylate | |
| (9 moles ethylene oxide) | |
| HLB 13.3 | |
| Difluoroethane | 15.7 |
| Dimethylether | 25.0 |
| Total | 100.0 |

The mixed surfactant system in this composition (sodium lauryl sulfate, isononyl phenol ethoxylate and primary alcohol ethoxylate) has an hydrophilic-lipophilic balance (HLB) of 12.2. However, substantially any other mixed surfactant system utilizing any type of anionic, nonionic or cationic emulsifiers can be used. The only requirement is that there be two or more surfactants, one of which has a low HLB, for example from about 1.0 to 10.4, and the other a high HLB, for example from about 11.0 to 42.0. The average HLB should be such that the mixed surfactant system has suitable solubility in the oil and water phases based on the respective compositions. Generally, however, the average HLB of the mixed surfactant system to form an oil-in-water microemulsion should be from about 10.6 to about 14.5, preferably from about 11.5 to about 13.0. For example, Triton X-100, a product of Rohm and Haas, which is an isooctyl phenyl ethoxylate having 7 moles ethylene oxide with an HLB of 13.5 or Triton N-101 which is an isononyl phenyl ethoxylate with 7 moles ethylene oxide having an HLB of 13.4 can be used in place of some or all of the Neodol 25-9 without adversely effecting the properties of the emulsion. Similarly, in place of the Igepal CO-430 other surfactants having HLB values of from about 8 to 9 can be used as a partial or total replacement to maintain the hydrophilic-lipophilic balance of about 12.2 for the mixed surfactant system.

Generally, many different specific mixed surfactant systems capable of providing oil-in-water microemulsions are disclosed in the above mentioned patent art as are the general requirements for HLB values and the methods for determining the HLB values for individual surfactants, as well as for mixed surfactant systems. For example, a good discussion of the theory of forming microemulsions and the HLB requirements can be found in the Robins, et al U.S. Pat. No. 3,641,181, the disclosure of which is incorporated herein by reference.

As representative of the nonionic surfactants, mention can be made of polyethoxylates derived from primary and secondary aliphatic alcohols having from 8 to 24 carbon atoms in the alcohol alkyl chain. These preferred ethoxylates frequently contain from 3 to about 14 moles of ethylene oxide per mole of hydrophobic moiety. However, there may be as many as 100 moles of ethylene oxide per mole of the hydrophobic moiety. In addition, part or all of the ethylene oxide may be replaced by propylene oxide.

Other suitable nonionic detergents include the polyoxyalkylene alkyl phenols wherein the hydrophobic group contains a phenolic nucleus having a substituent alkyl group of at least 4 but preferably 8 to 12 carbon atoms and the hydrophilic portion is comprised of at least 3 but preferably 6 to 100 moles of ethylene oxide or propylene oxide per mole of alkyl phenol. Exemplary of this type are the Igepals such as Igepal CO-430, Igepal CO-630 (ethoxylated nonyl phenol with an average ethylene oxide content of 9.5 moles per mole of nonyl phenol), Igepal CO-880 (ethoxylated nonyl phenol with an average ethylene oxide content of 30 moles per mole of nonyl phenol), etc.

Still other suitable nonionic surfactants include the polyalkylene esters of the higher organic acids usually having 8 or more carbon atoms in the acid hydrophobe, and 10 or more moles of ethylene oxide as a hydrophilic group; polyalkylene alkyl amines whose hydrophobic group is from a primary, secondary or tertiary amine and whose ethylene oxide content is sufficiently high to impart both water solubility and nonionic characteristics, usually derived from fatty acids with 8 or more carbons; polyalkylene alkyl amides having a hydrophobic group derived from an amide of a fatty acid or ester; fatty acid esters of glycols, polyalkylene oxide block copolymers and the like. Typical examples of these other classes of nonionic surfactants include those commercially available under the designation "Tergitol" from Union Carbide, "Myrj" from Atlas Chemical Industries, "Ethofat" from Armac Co., "Priminox" from Rohm and Haas Co., "Ethomid" from Armac Co., "Tween" from Atlas Chemical Division of ICI America, "Pluronic" from BASF Wyandotte Co., and many others which are well known in the art.

As representative of the anionic surfactants, mention can be made of, for example, alkyl aryl sulfonates of 6 to 20 carbon atoms in the alkyl group; $C_{10}$–$C_{22}$ fatty acid soaps; $C_{10}$–$C_{22}$ fatty sulfates; $C_{10}$–$C_{22}$ alkyl sulfonates, including the alkali metal salts of the higher alkyl and linear paraffin sulfonic acids and salts thereof; alkali metal dialkyl sulfosuccinates, and the like.

The alkali metal $C_{12}$–$C_{22}$ alkyl sulfonates are particularly preferred.

As representative of the cationic surfactants mention can be made of the quaternary ammonium surfactants and the alkyl amido betaines.

The amount of the mixed surfactant system is not particularly critical so long as it is sufficient to stably maintain the microemulsion. Generally, the amount of the mixed surfactant system can range from about 3 to about 20% by weight, preferably from about 5 to 9% by weight based on the total composition. Also, the proportions of the nonionic and anionic or other surfactants in the mixed surfactant system are not particularly critical so long as the average hydrophobic-lipophobic balance of the mixed surfactant system is within the above defined range.

Referring again to the typical composition according to the present invention as given above, it will be generally appreciated that in addition to the mixed surfactant system, there is also present a polar liquid, namely water, and a water-immiscible liquid, namely methylene chloride, as well as the gaseous propellants. However, the present invention is not limited to water as the polar solvent or methylene chloride as the water-immiscible liquid. In addition other gaseous flammable propellants can be used in place of all or part of the difluoroethane and dimethyl ether propellant named above.

Regarding the water phase, any other water soluble polar solvents or salt additives can be used and the selection of the particular polar solvent or polar phase additives can be readily selected depending on the intended end use of the propellant composition. Naturally, any other water soluble polar solvent should also be non-flammable. In terms of cost, safety to the environment, and non-flammability, water is the preferred polar solvent to form the continuous external phase of the microemulsion systems of the present invention.

The amount of the water or other water soluble solvent can range from about 15 to about 25% by weight, preferably from about 18 to 23% by weight, based on the total composition.

Similarly, substantially any water-immiscible solvent can be used in place of all or part of the methylene chloride. Thus, aliphatic or aromatic hydrocarbons, chlorinated hydrocarbons or mixtures thereof can be used to form the dispersed oil phase. Examples of other non-aqueous liquids, which can be used as the oil phase, include, for example, hydrocarbons such as hexane, benzene, toluene, xylene, mineral spirits, petroleum ethers, and other similar hydrocarbons. Other water-immiscible liquids include the oxygenated hydrocarbons, such as the higher molecular weight acids, esters, ketones or alcohols. Other chlorinated hydrocarbons include, for example, carbon tetrachloride, chloroform, ethylene dichloride, dichlorodifluoroethane, and the like. Naturally, the water-immiscible liquid must be one in which the normally gaseous flammable aerosol propellants are soluble to the highest possible degree. Methylene chloride is especially preferred in view of its non-flammability, low cost, and high dissolving power for the gaseous propellants.

The amount of the water-immiscible liquid may range from about 23 to about 35% by weight, preferably from about 25 to 33% by weight, based on the total composition.

The final essential component of the compositions of this invention are the normally flammable gaseous propellants. Substantially any of the known propellants for aerosol containers can be used in the present invention, and include the gaseous hydrocarbons such as n-butane, iso-butane and propane, and the halogenated hydrocarbons such as difluoroethane, 1,1,1-chlorodifluoroethane, and the like.

As previously pointed out, one of the advantages of the compositions of the present invention is that the gaseous propellant can be present in the compositions in amounts much greater than otherwise possible without becoming flammable. Thus, amounts of the gaseous propellants of from about 30 to about 55% by weight of the composition, preferably from about 35 to 45% by weight of the composition can be achieved.

Another advantageous feature of the compositions of this invention is that the microemulsions can readily be formed simply by metering the ingredients, other than the gaseous propellants, into the aerosol container, under suitable pressure, the gaseous propellant or propellants and sealing the container. Mere shaking of the container spontaneously forms the microemulsion. Accordingly, it is possible to eliminate the large batching and mixing tanks, high shear mixers and homogenizers, heating units and other components normally needed to form emulsions before adding them to an aerosol container.

These hydrocarbon propellants and the aerosol compositions based thereon can be used in a wide variety of end uses depending on the specific selection of solvents and chemical additives added to the system. Many such potentials uses for delivery of a broad variety of hydrophobic substances which can also be dissolved in the dispersed oil phase micro-droplets are mentioned in the Rosano U.S. Pat. No. 4,146,499. Hence, by using water soluble chemical additives, a broad array of aerosol compositions can be formulated. As representative of the type of "active" ingredients which can be included in the aerosol propellant compositions of this invention in addition to those cases where the surfactants and/or solvents provide the "active" role such as in various cleaning compositions, laundry pre-spotter compositions, and the like, mention can be made of active ingredients for such applications as, for example, antistatic sprays, aerosol air fresheners, paint and coating sprays, deicing and defogging compositions, and a variety of others, which will become apparent to the skilled practitioner.

Additional representative examples of compositions within the scope of the invention are shown in the following examples which are provided merely by way of illustration and are not intended to be comprehensive of the scope of the invention.

EXAMPLE 1

| Ingredient | Weight % | | | | | |
|---|---|---|---|---|---|---|
| | A | B | C | D | E | F |
| Water | 18.4 | 18.9 | 18.7 | 17.9 | 22.0 | 21.6 |
| Methylene Chloride | 25.1 | 25.8 | 25.6 | 24.4 | 30.0 | 29.3 |
| Sipon WD | 0.25 | 0.43 | 0.34 | 0.3 | 0.3 | 0.34 |
| Igepal CO-430 | 2.9 | 3.0 | 3.0 | 2.9 | 3.5 | 3.5 |
| Neodol 25-9 | 2.9 | 3.0 | | | 3.5 | |

-continued

| Ingredient | Weight % | | | | | |
|---|---|---|---|---|---|---|
| | A | B | C | D | E | F |
| Triton N-101 | | | 3.0 | 2.9 | | 3.5 |
| Difluoroethane | 13.4 | 13.7 | 13.6 | 12.9 | | 15.5 |
| Dimethylether | 36.9 | 35.2 | 35.8 | 38.7 | | 23.3 |
| Propane | | | | | 16.0 | |
| Butane | | | | | 25.0 | |
| Carbon dioxide | | | | | | 3.0 |
| HLB | 12.2 | 13.0 | 12.7 | 12.5 | 12.2 | 12.4 |

Each of the above formulations A–F provide clear, stable oil-in-water microemulsions. These compositions are prepared by metering the surfactants, water and methylene chloride into an aerosol dispenser and separately filling the dispenser with the gaseous propellants under suitable pressure, for example, about 50 to 60 pounds per square inch. The mere shaking of the container results in spontaneous formation of the microemulsion, which is quite stable. Compressed gases, such as carbon dioxide shown in formulation F, may then be added if further suppression of the flammability of the composition is desired.

I claim:

1. A propellant composition for aerosol dispensers capable of forming, at pressures suitable for delivering an aerosol from the aerosol dispenser, an oil-in-water microemulsion, said aerosol being characterized by its suppressed flammability, the composition comprising (a) a mixture comprising by weight of the total weight of the composition from about 23 to about 35% of a water-immiscible liquid which is a solvent for the propellant, from about 15 to about 25% water, and from about 3 to about 20% of a mixed surfactant system of at least one primary and at least one secondary surfactant, and (b) at least about 30% by weight of the total weight of the composition of at least one normally gaseous flammable aerosol propellant provided to pressurize the aerosol dispenser, the propellant being soluble in the water-immiscible liquid, said mixed surfactant system having a hydrophilic-lipophilic balance sufficient to cause the water-immiscible liquid in which the propellant is dissolved to disperse as micro-droplets in the water upon shaking of the aerosol dispenser, the micro-droplets being separated from the continuous water phase by the mixed surfactant system.

2. The composition of claim 1 wherein the total amount of propellant is in the range of from about 30% to about 55% by weight based on the weight of the composition.

3. The composition of claim 2 wherein the water-immiscible liquid is methylene chloride.

4. The composition of claim 2 wherein the mixed surfactant system comprises a first nonionic surfactant emulsifier having a HLB in the range of from about 1.0 to about 10.4 and a second nonionic surfactant emulsifier having an HLB in the range of from about 11.0 to about 42.0, the HLB of the mixed surfactant system being between 10.6 to 14.5.

5. The composition of claim 4 wherein the mixed surfactant system further comprises an alkali metal salt of an alkyl sulfate anionic surfactant.

6. The composition of claim 4 wherein the HLB of the mixed surfactant system is from about 11.5 to about 13.0.

7. The composition of claim 6 wherein the mixed surfactant system contains as the primary and the secondary surfactants two or more surfactants selected from the group consisting of isooctyl and isononyl phenol ethoxylates, and alkyl alcohol ethoxylates having from 8 to 24 carbons in the alkyl, said mixed surfactant system being present in an amount of from 5 to 9% by weight of the total composition.

8. The composition of claim 2 wherein the normally gaseous flammable propellant is selected from the group consisting of propane, butane, isobutane, dimethylether, and difluoroethane, and mixtures thereof.

9. The composition of claim 1 further comprising a compressed gas to further suppress flammability of the composition.

10. The composition of claim 9 wherein the compressed gas is selected from the group consisting of carbon dioxide, nitrous oxide, nitrogen, and nonflammable fluorocarbons.

11. The composition of claim 9 wherein the compressed gas is carbon dioxide.

12. The composition of claim 1 which comprises

| Ingredient | Parts by Weight |
|---|---|
| Water | 22.0 |
| Methylene chloride | 30.0 |
| Sodium lauryl sulfate | 0.3 |
| Isononyl phenol ethoxylate (4 moles ethylene oxide) | 3.5 |
| Primary alcohol ethoxylate (9 moles ethylene oxide) | 3.5 |
| Difluoroethane | 15.7 |
| Dimethylether | 25.0. |

13. The composition of claim 12 further comprising a compressed gas up to the saturation limit of the composition therefore, the gas selected from the group consisting of carbon dioxide, nitrous oxide, nitrogen, and nonflammable fluorocarbons.

14. The composition of claim 13 wherein the gas is carbon dioxide.

15. A method for preparing a propellant composition suitable for delivering an aerosol from an aerosol dispenser, said aerosol being characterized by its suppressed flammability, the method comprising the steps of filling an aerosol dispenser with a mixture comprising by weight of the total weight of the composition from about 23 to about 35% of a water-immiscible liquid which is a solvent for the propellant, from about 15 to about 25% water, and from about 3 to about 20% of a mixed surfactant system of at least one primary surfactant and at least one secondary surfactant, and pressurizing the aerosol dispenser with at least about 30% by weight of the total weight of the composition of at least one normally gaseous flammable propellant, whereby an oil-in-water microemulsion can be formed by shaking said aerosol dispenser, the at least one propellant being dissolved in the water-immiscible liquid to form micro-droplets constituting the dispersed oil phase, the micro-droplets being separated from the continuous water phase by the mixed surfactant system.

16. The method of claim 15 further comprising injecting a compressed gas into said composition, the gas being selected from the group consisting of carbon dioxide, nitrogen, nitrous oxide and nonflammable fluorocarbons.

17. The method of claim 15 wherein the normally gaseous flammable propellant is selected from the group consisting of propane, butane, isobutane, dimethylether, and difluoroethane, and mixtures thereof.

18. The method of claim 17 wherein the total amount of propellant is in the range of from about 30% to about 55% by weight based on the weight of the composition.

19. The method of claim 18 wherein the mixed surfactant system comprises a primary nonionic surfactant emulsifier having a HLB in the range of from about 1.0 to about 10.4 and a second nonionic surfactant emulsifier having an HLB in the range of from about 11.0 to about 42.0, the HLB of the mixed surfactant system being between 10.6 to 14.5.

20. The method of claim 19 wherein the HLB of the mixed surfactant system is from about 11.5 to about 13.0.

21. The method of claim 20 wherein the mixed surfactant system contains as the primary and the secondary surfactants two or more surfactants selected from the group consisting of isooctyl and isononyl phenol ethoxylates, and alkyl alcohol ethoxylates having from 8 to 24 carbons in the alkyl, said mixed surfactant system being present in an amount of from 5 to 9% by weight of the total composition.

* * * * *